Dec. 30, 1947. A. M. YOUNG 2,433,641
AIRCRAFT WITH PUSHER TYPE PROPELLER FOR STABILIZING AND STEERING
Filed March 15, 1944 2 Sheets-Sheet 1
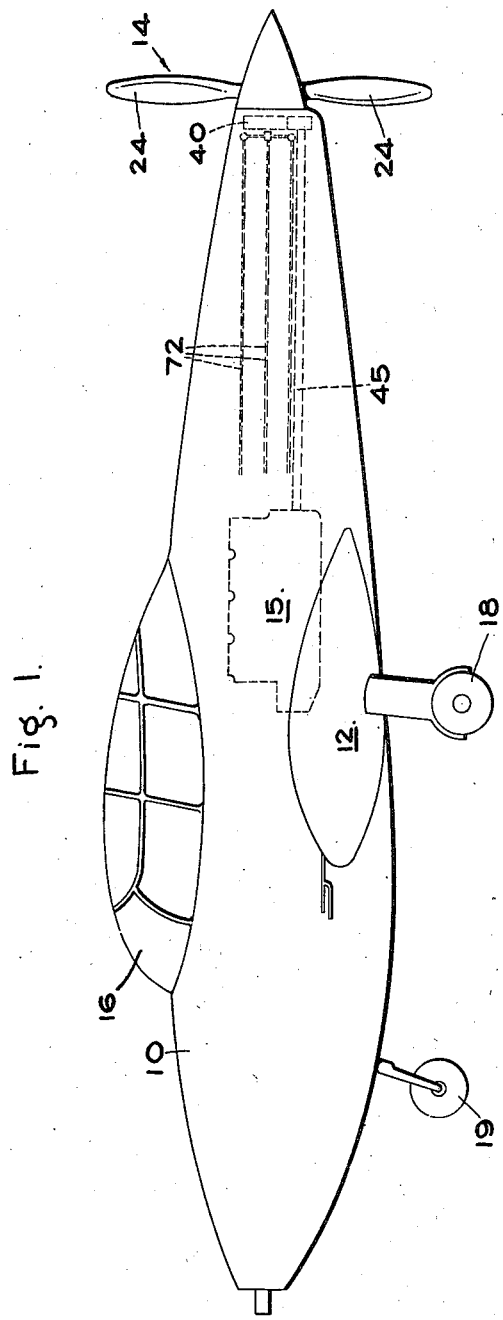
INVENTOR
ARTHUR M. YOUNG
BY
Beau, Brooks, Buckley & Beau.
ATTORNEYS

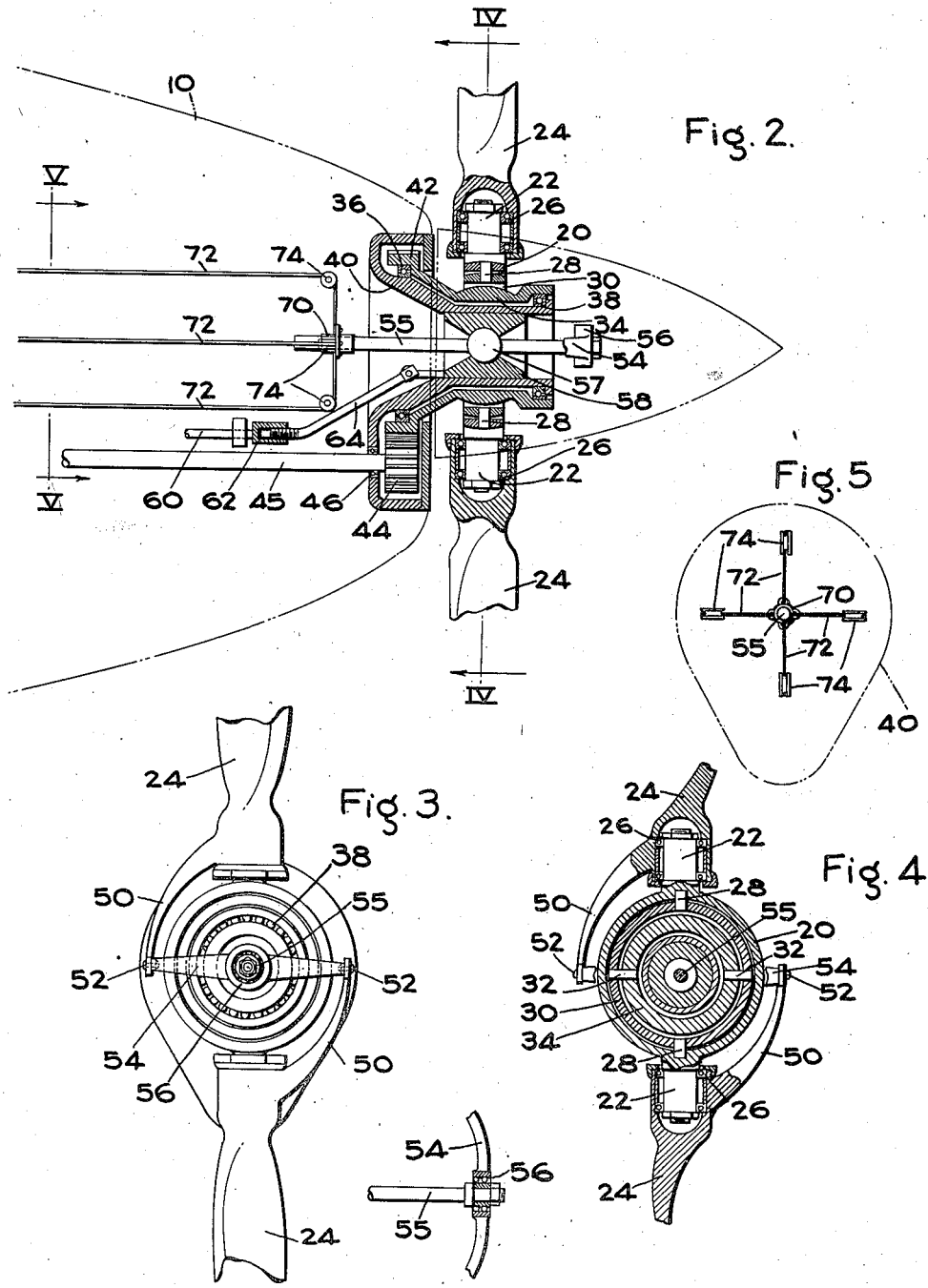

Patented Dec. 30, 1947

2,433,641

UNITED STATES PATENT OFFICE 2,433,641

AIRCRAFT WITH PUSHER TYPE PROPELLER FOR STABILIZING AND STEERING

Arthur M. Young, Buffalo, N. Y.

Application March 15, 1944, Serial No. 526,549

2 Claims. (Cl. 244—51)

This invention relates to aircraft, and more particularly to improvements in directional control and stabilizing means therefor.

A primary object of the invention is to provide an improved aircraft type in which the lift means and the thrust propeller means are relatively arranged in novel manner, and wherein a propeller thrust control means of novel form is employed whereby to obtain an aircraft of improved controllability and flight efficiency and stability. Another object of the invention is to provide an improved type airplane having the characteristics aforesaid and which is of structurally simplified form; whereby to be lighter in weight; lesser in bulk; cheaper to manufacture; aerodynamically more efficient; and easier to handle and control.

Another more specific object of the invention is to provide a novel airplane type comprising essentially only a fuselage; a fixed wing; a propeller; and a novel propeller control means for varying the direction of the propeller thrust, thus eliminating the necessity for fin surfaces of adjustable control or stabilizer type while providing an airplane which is fully controllable even at reduced speeds such as under which movable control surfaces of conventional airplanes would be stalled.

A more specific object of the invention is to provide an airplane of the fixed lift wing type with a pusher propeller so disposed relative to the longitudinal position of the center of gravity of the airplane and so controllable as to provide the requisite stabilizing and control thereof, whereby to dispense with the need of conventional empennage type stabilizer and pitch and directional control surfaces. Another object is to provide a novel form of pusher type airplane in which the lift wing and propeller elements are so relatively disposed as to provide an improved stabilizing of the airplane flight, in combination with a novel propeller control means whereby the propeller is readily controllable by the pilot to provide airplane flight characteristics of novel form.

Another object is to provide an airplane design which is adapted to provide improved visibility for the flight personnel; improved provision for armament and the like; and an improved disposition of the propeller and of the wing elements of the airplane relative to the other elements of the airplane structure. Other objects and advantages of the invention will appear in the specification hereinafter.

In the drawings:

Fig. 1 is a side elevation of an airplane of the invention;

Fig. 2 is a fragmentary elevation, on an enlarged scale, of the tail end of the airplane of Fig. 1, showing portions of the propeller mount and drive mechanism in section;

Fig. 3 is a fragmentary end elevation of the propeller mount and control mechanism;

Fig. 4 is a section taken substantially along line IV—IV of Fig. 1;

Fig. 5 is a section taken along line V—V of Fig. 2 of the propeller control means; and Fig. 6 is a fragmentary top plan, partly in section, of a detail of the propeller control mechanism.

The present invention is the outgrowth of discoveries made by applicant in connection with studies relating initially to flight characteristics of rotary wing type aircraft. For example, I have determined that a helicopter can be made stable by mounting the rotor at the center of gravity of the entire aircraft. Such an arrangement is impractical however from a structural standpoint, and my investigations were therefore extended and I determined that more generally a stable helicopter could be provided by mounting the rotor above the center of gravity while providing another rotor or a fin structure below the center of gravity. The size of the fin structure requisite in such case to attain substantial stability depends upon the distance thereof from the center of gravity.

Experiments on airplane type machines then revealed that if the propeller is located ahead of the center of gravity of an airplane it has the effect of increasing the instability of the aircraft both in pitch and in yaw. It seems that the propeller has the effect of a fin area, and when disposed ahead of the wing of an airplane it requires that a balancing fin area be provided at the tail of the airplane to balance the fin area effect of the propeller. As the result of further studies, however, I have determined that the propeller may be disposed behind the center of gravity of an airplane, and that if properly arranged it will thereupon provide a wing stabilizing effect such as will minimize or eliminate the necessity for any conventional empennage or Canard type fin surfaces. Furthermore, the direction of the propeller thrust may then be variably controlled so as to provide the necessary changes in pitch and yaw moments for flight control purposes. This may be accomplished by feathering of the propeller blades to orient the direction of the propeller thrust; and in either case an important feature of this arrangement is that the airplane is at all times controllable even under low speed flight conditions such as would result in stalling of aerodynamic control surfaces of conventional type airplanes. Inasmuch as the propeller blades are being engine driven at all times, irrespective of the air speed of the airplane, their speed will be such as to preclude the possibility of their stalling. Whereas various methods for controlling aircraft have been discussed hereinabove, the present invention contemplates, in order to simultaneously obtain the stabilizing and control features thereof by mounting the propeller rearwardly of the center of gravity of the aircraft, considering the direction of flight, and in such manner that the propeller is universally inclinable on the aircraft structure, in combination with a propeller blade feathering control arrangement whereby steering of the aircraft may be accomplished, as will be explained more fully hereinafter.

For purposes of exemplification, an airplane embodying the features of the invention referred to hereinabove is illustrated in the drawing as comprising generally a fuselage 10 having a fixed lift wing 12 and a pusher propeller designated 14 at the tail of the fuselage. An engine 15 is provided interiorly of the fuselage for driving the propeller, and a canopy-enclosed passenger compartment is illustrated at 16 ahead of the engine and closely adjacent the center of pressure of the wing 12. A tricycle type landing gear is provided to comprise a pair of directionally fixed wheels 18 just aft of the center of gravity in the airplane, and a swivelling or steerable nose wheel 19.

As shown in Figs. 2–5, the propeller mounting and driving and control mechanisms of the airplane include a hub 20 carrying a pair of diametrically opposed shafts 22—22. Each shaft 22 supports a propeller blade 24 which is rotatably mounted upon its corresponding hub shaft by means of bearings 26—26 for blade pitch change purposes. The hub 20 is carried by means of diametrically arranged pins 28—28 upon a ring 30 which is in turn carried by diametrically paired pins 32—32 upon a driving sleeve 34. The axis of the pins 32—32 is disposed at right angles to the axis of the pins 28—28, whereby it will be understood that the propeller hub 20 is keyed to the driving sleeve 34 but is movable thereon so that the plane of propeller rotation is universally inclinable relative to the axis of the sleeve 34.

The driving sleeve 34 is carried by means of spaced bearings 36—38 to rotatably encompass a hollow bracket 40 which is suitably fixed to any stationary structure of the airplane. The bracket and driving sleeve mechanism is so arranged as to dispose the rotation axis of the sleeve longitudinally of the airplane; and thus, the propeller is mounted to rotate in a plane generally transverse to the longitudinal axis of the airplane, but to be universally inclinable thereto as explained hereinabove. The sleeve 34 carries a ring gear 42 at its inner end which meshes with a pinion 44 driven by the engine drive shaft 45 and mounted upon the bracket 40, as by bearings at 46.

The propeller blades 24—24 are provided with corresponding pitch control horns 50—50 which extend laterally of the propeller blade roots as integral portions thereof so as to partially encircle the propeller hub structure and to terminate at swivel connection devices 52—52. The devices 52—52 are disposed diametrically relative to the axis of rotation of the drive sleeve 34 and on an axis extending at right angles of the longitudinal axis of the propeller blades 24—24. The pitch control horns 50—50 are connected at their swivel joint devices 52—52 to corresponding ends of a cross bar 54 which is carried at the outer end of a control strut 55 by means of a ball bearing mount as indicated at 56. The strut 55 extends through the hollow interior of the bracket 40, and is supported intermediately of its ends by means of a ball portion 57 thereof which is carried by a socketed bearing block 58. The block 58 is slidably mounted within the bracket 40 so as to be displaceable in directions longitudinally of the control strut, and it is arranged that the position of the bearing block 58 relative to the propeller bracket 40 may be shifted at will by the airplane pilot through rotation of a control rod 60 which terminates in a threaded nut and screw connection at 62 with a push-pull member 64 extending into fixed connection with the bearing block 58. Thus, it will be understood that pilot-manipulation of the control rod 60 will cause the push-pull member 64 to displace the bearing block 58 longitudinally of the airplane in such manner as to shift the control strut 55 for simultaneous and similar pitch change adjustments of the propeller blades 24—24 about their hub shaft members 22—22. Thus, pitch change adjustments of the drive propeller may be made at will by the pilot, such as are required to attain efficient flight operations.

The inner end of the control strut 55 carries a freely slidable bracket 70 to which are attached corresponding ends of four control cables 72 (Figs. 2 and 5). The cables are arranged to train away from the connection bracket 70 in radial directions, and the cables are arranged in oppositely pulling pairs; the direction of pull of each pair being disposed at right angles to the direction of pull of the other pair. For this purpose the cables are trained over corresponding pulleys 74 and then lead forwardly to the pilot cockpit for connection to any suitable pilot control device such as is universally rockable to procure alternate pulls upon the cables of each pair without interference with similar control movements of the other pair of control cables. Thus, it will be understood that pilot manipulation of the cable control device will cause the control strut 55 to be rocked about the center of the bearing device 57—58 in any desired direction because of the universal characteristics of the bearing. Consequently, the outer end of the control strut 55 may be caused to move to any desired position of eccentricity relative to the axis of the driving sleeve 34, whereby the blade pitch control horns 50—50 of the propeller device will be variably adjusted in such manner as to cyclically vary the angle of attack of the propeller blades as they are driven to rotate by the airplane engine. Thus, as each blade travels through the segment of the propeller arc corresponding to the region of adjustment of the control horns 50—50 to maximum angle attack position, the blade will provide a correspondingly increased thrust; whereas the other blade will be coincidentally moving through a region of minimum angle of attack adjustment and will thereby provide a thrust of reduced order. As a result the propeller will shift upon its ring and pin hub devices so that the plane of rotation of the propeller will be altered. Hence, the general direction of the thrust forces of the propeller will be shifted relative to a longitudinal center line of the airplane, and there is thereby provided means for steering the airplane both in pitch and in yaw.

It will be understood of course that in lieu of the specific collective pitch and cyclical pitch change control devices illustrated and described hereinabove, any other suitable control devices for the purpose referred to may be employed, and that in any case the directional control arrangement of the invention may be provided of mechanically simple form, and to be entirely effective and readily controllable by the airplane pilot to procure any desired composition of airplane pitch and yaw moment forces for controlling the airplane directionally in any desired manner. For example, a slightly modified form of blade pitch control mechanism which is adapted for the purpose described hereinabove is shown in my U. S. Patent 2,256,918 at Figs. 4–6 thereof.

In any case, the invention provides that directional control and stability is accomplished without the use of aerodynamic surfaces such as elevators; rudders; and stabilizing fin areas, through taking advantage of the fin area effect of the propeller as explained hereinabove. It will also be appreciated that because the propeller per se provides the directionally changing thrust forces which control the flight of the airplane an improved control arrangement is provided. This is because the propeller blades are engine driven to rotate at speeds sufficient to preclude stalling of the propeller blades. Therefore the airplane may be adequately controlled even at speeds at which the wing would normally stall. Another advantage of the arrangement of the airplane of the invention is that the disposition of the propeller at the tail of the fuselage frees the forward end of the fuselage from the necessity of carrying engine and propeller mechanisms, thereby permitting a fuselage arrangement providing improved visibility from the passenger compartment and additional space in the nose of the fuselage to receive armament or the like, as in the case of military airplanes. Also, the airplane arrangement of the invention is particularly adapted to employ a tricycle type landing gear which will at the same time dispose the tail propeller at sufficient elevation to provide ample clearance relative to the ground, while disposing the wing relatively close to the ground to gain the advantage of the so-called "ground cushioning" effect during landings and taking offs.

I claim:
1. An aircraft including propeller means mounted thereon and controlled to maintain stability of the aircraft during changes in the direction of thrust of the propeller for steering purposes, said propeller comprising a hub and blade means located behind the center of gravity of the aircraft in the direction of flight, and means mounting said hub upon the aircraft to be universally inclinable thereto, said blade means being adjustable relative to the hub for pitch change purposes, blade pitch change control means adapted to be pilot-actuated for power output pitch change effects including means for cyclically variable pitch changes of said blade means to procure changes of the direction of thrust of said propeller for steering the aircraft.

2. An aircraft including propeller means mounted thereon and controlled to maintain stability of the aircraft during changes in the direction of thrust of the propeller for steering purposes, said propeller comprising a hub and blade means located behind the center of gravity of the aircraft in the direction of flight, and means mounting said hub upon the aircraft to be universally inclinable thereto, said blade means being adjustable relative to the hub for pitch change purposes, and blade pitch change control means adapted to be pilot-actuated for cyclically varying the pitch of said blade means during rotation thereof to procure changes of the direction of thrust of said propeller for aircraft pitch and yaw control purposes.

ARTHUR M. YOUNG.

REFERENCES CITED

The following references are of record in the file of this patent:

UNITED STATES PATENTS

| Number | Name | Date |
|---|---|---|
| 1,230,045 | Skrivanek | June 12, 1917 |
| 2,043,704 | McPherren | June 9, 1936 |
| 2,256,918 | Young | Sept. 23, 1941 |
| 2,308,802 | Barling | Jan. 19, 1943 |
| 2,382,460 | Young | Aug. 14, 1945 |
| 2,406,506 | Northrop | Aug. 27, 1946 |

FOREIGN PATENTS

| Number | Country | Date |
|---|---|---|
| 680,813 | Germany | Sept. 7, 1939 |

OTHER REFERENCES

"Aviation" for February 1947, pages 37–42.